(12) United States Patent
Ahmed et al.

(10) Patent No.: US 12,095,377 B2
(45) Date of Patent: Sep. 17, 2024

(54) DISCHARGE PREVENTION OF THE POWER SWITCH IN A POWER CONVERTER

(71) Applicant: POWER INTEGRATIONS, INC., San Jose, CA (US)

(72) Inventors: Munadir A. Ahmed, Sna Mateo, CA (US); Aditya J. Kulkarni, Milpitas, CA (US)

(73) Assignee: POWER INTEGRATIONS, INC., San Jose, CA (US)

( * ) Notice: Subject to any disclaimer, the term of this patent is extended or adjusted under 35 U.S.C. 154(b) by 236 days.

(21) Appl. No.: 17/776,959

(22) PCT Filed: Dec. 12, 2019

(86) PCT No.: PCT/US2019/065927
§ 371 (c)(1),
(2) Date: May 13, 2022

(87) PCT Pub. No.: WO2021/118566
PCT Pub. Date: Jun. 17, 2021

(65) Prior Publication Data
US 2022/0399825 A1     Dec. 15, 2022

(51) Int. Cl.
*H02M 3/335* (2006.01)
*H02M 1/00* (2006.01)
*H02M 1/34* (2007.01)

(52) U.S. Cl.
CPC ..... *H02M 3/33592* (2013.01); *H02M 1/0032* (2021.05); *H02M 1/342* (2021.05); *H02M 3/33523* (2013.01)

(58) Field of Classification Search
CPC ......... H02M 3/33592; H02M 3/33523; H02M 3/33553; H02M 3/33576; H02M 1/0032
See application file for complete search history.

(56) References Cited

U.S. PATENT DOCUMENTS

| | | | |
|---|---|---|---|
| 7,245,510 B2 | 7/2007 | Baeurle et al. | |
| 8,520,414 B2* | 8/2013 | Garrity | H02M 3/33569 363/21.14 |
| 9,312,777 B2 | 4/2016 | Lefedjiev et al. | |

(Continued)

FOREIGN PATENT DOCUMENTS

WO    2017095408 A1    6/2017
WO    2021/183882 A2    9/2021

*Primary Examiner* — Alex Torres-Rivera

(57) ABSTRACT

A power converter including a controller to control a synchronous rectifier (SR) switch. The controller includes a request control circuit and a discharge prevention circuit. The request control circuit is configured to generate a request signal in response to an output of the power converter. The request control circuit generates a secondary control signal to control the SR switch. The discharge prevention circuit is configured to prevent a parasitic capacitance discharge of a power switch caused by a turn on of the SR switch. The discharge prevention circuit is further generates a prevent signal to disable the secondary control signal from control of the synchronous rectifier switch when a period of the request signal is greater than a first time threshold, and enable the secondary control signal to control the synchronous rectifier switch when the period of the request signal is less than a second time threshold.

31 Claims, 6 Drawing Sheets

(56) References Cited

U.S. PATENT DOCUMENTS

| | | | |
|---|---|---|---|
| 9,374,011 B2* | 6/2016 | Liu | H02M 3/33592 |
| 9,866,108 B2 | 1/2018 | Mayell et al. | |
| 10,141,765 B2 | 11/2018 | Balakrishnan et al. | |
| 10,186,976 B2 | 1/2019 | Duvnjak | |
| 10,965,218 B1 | 3/2021 | Odell | |
| 2010/0110732 A1* | 5/2010 | Moyer | H02M 3/33592 |
| | | | 363/19 |
| 2014/0204623 A1* | 7/2014 | Djenguerian | H02M 3/33523 |
| | | | 363/21.12 |
| 2016/0111961 A1* | 4/2016 | Balakrishnan | H02M 3/33507 |
| | | | 363/21.12 |
| 2017/0155335 A1* | 6/2017 | Chang | H02M 1/36 |
| 2021/0167680 A1 | 6/2021 | Odell et al. | |

* cited by examiner

US 12,095,377 B2

DISCHARGE PREVENTION OF THE POWER SWITCH IN A POWER CONVERTER

BACKGROUND INFORMATION

Field of the Disclosure

The present invention relates generally to power converters, and more specifically for preventing a parasitic capacitance discharge of a power switch caused by a turn on of the synchronous rectifier switch.

Background

Electronic devices (such as cell phones, tablets, laptops, etc.) use power to operate. Switched mode power supplies are commonly used due to their high efficiency, small size, and low weight to power many of today's electronics. Conventional wall sockets provide a high voltage alternating current. In a switching power supply, a high voltage alternating current (ac) input is converted with switched mode power converters to provide a well-regulated direct current (dc) output through an energy transfer element to a load. In operation, a switch is turned ON and OFF to provide the desired output by varying the duty cycle (typically the ratio of the on time of the switch to the total switching period), varying the switching frequency, or varying the number of on/off pulses per unit time of the switch in a switched mode power converter.

Switched mode power converters may include a clamp circuit coupled across a primary winding of the energy transfer element to prevent damage to the switch. Generally the clamp circuit includes passive components, such as diodes, resistors or capacitors. In general, a passive component may store or maintain energy in the form of voltage or current. An active component may produce energy in the form of a voltage or current. One example of an active component may be a transistor.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

Figure 1:
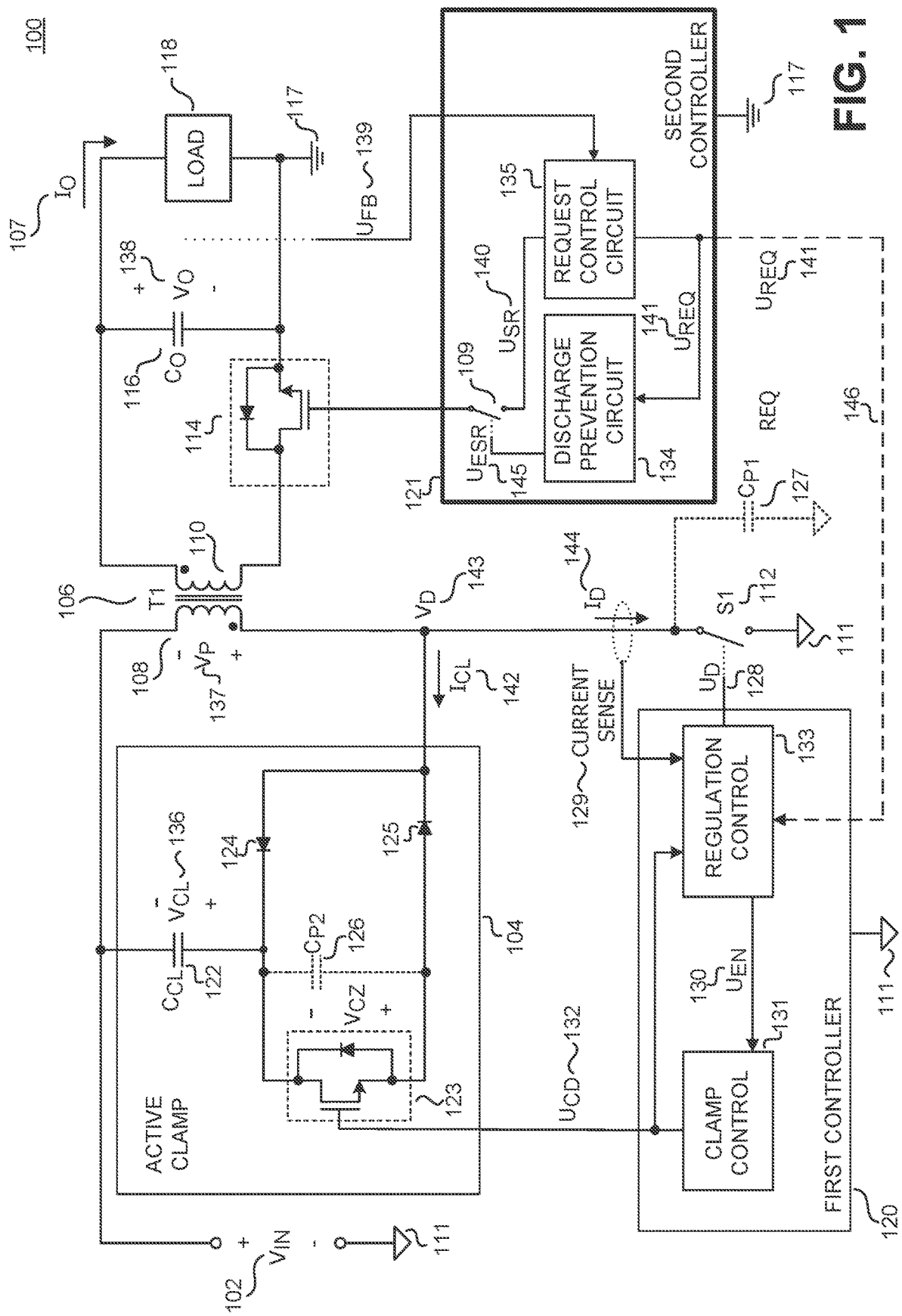
FIG. 1 illustrates one example of a power converter with an active clamp, a first controller, and a second controller, according to some embodiments of the present disclosure.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention.

DETAILED DESCRIPTION

Examples of a controller to prevent a discharge of a power switch caused by a turn on of the synchronous rectifier are described herein. In the following description, numerous specific details are set forth in order to provide a thorough understanding of the present invention. It will be apparent, however, to one having ordinary skill in the art that the specific detail need not be employed to practice the present invention. In other instances, well-known materials or methods have not been described in detail in order to avoid obscuring the present invention.

Reference throughout this specification to "one embodiment," "an embodiment," "one example," or "an example" means that a particular feature, structure or characteristic described in connection with the embodiment or example is included in at least one embodiment of the present invention. Thus, appearances of the phrases "in one embodiment," "in an embodiment," "one example," or "an example" in various places throughout this specification are not necessarily all referring to the same embodiment or example. Furthermore, the particular features, structures or characteristics may be combined in any suitable combinations and/or subcombinations in one or more embodiments or examples. Particular features, structures or characteristics may be included in an integrated circuit, an electronic circuit, a combinational logic circuit, or other suitable components that provide the described functionality. In addition, it is appreciated that the figures provided herewith are for explanation purposes to persons ordinarily skilled in the art and that the drawings are not necessarily drawn to scale.

A power converter such as a flyback converter with an active clamp circuit can provide higher efficiency due to achieve zero voltage switching on a power switch. The active clamp circuit can provide several purposes: limits the voltage across the drain of the power switch, and can also recycle energy into the output rather than being dissipated. At each turn off of the power switch, a clamp capacitor of the active clamp driver is charged. For a flyback converter with a synchronous rectifier (SR) switch, once the power switch is turned off, the SR switch is turned on to charge the output capacitor. The on time of the SR switch corresponds to the secondary current being greater than zero. The on time varies in response to the load.

At light or no load conditions, the clamp capacitor can be charged to a voltage smaller than the reflected voltage of the secondary voltage. After the power switch is turned off, energy is transferred from the primary winding to the secondary winding. To avoid noise that would accidentally turn off the SR switch, typically the SR switch is turned on for at least a minimum on time. When the secondary current reduces to below zero, an undesirable operation occurs where the output capacitor discharges and begins to charge the secondary winding. The turn off of the SR switch would then cause energy to transfer back from the secondary winding into the primary winding, which can cause the drain voltage to below ground. The disclosure includes circuitry that would prevent the undesirable condition from occurring by disabling a control of the SR switch at light or no load conditions. In other words, the SR switch is not allowed to turn on at light or no load conditions.

To illustrate, FIG. 1 illustrates a diagram of an example power converter 100 including an example active clamp circuit 104, a first controller 120 and a second controller 121 in accordance with the teachings of the present disclosure. The illustrated example of the power converter 100 includes an energy transfer element 106, a primary winding 108 of the energy transfer element 106, a secondary winding 110 of the energy transfer element 106, an input return 111, power switch S1 112, an active clamp circuit 104, a SR switch 114, an output capacitor $C_O$ 116, and an output return 117. The active clamp circuit 104 is shown as including a clamp capacitor $C_{CL}$ 122, an active clamp switch 123 (represented as a transistor with an associated anti-parallel diode), and diodes 124, 125.

The first controller 120 is shown as including a clamp control circuit 131 and a regulation control circuit 133. In dashed lines, a parasitic capacitance $C_{P1}$ 127 is shown to represent all the capacitance that couples to the power switch S1 112 and may include natural capacitance internal to the energy transfer element 106, the natural internal capacitance of power switch S1 112 and/or discrete capacitors. Also shown in FIG. 1 are an input voltage $V_{IN}$ 102, an output voltage $V_O$ 138, an output current $I_O$ 107, a drive signal $U_D$ 128, a clamp enable signal $U_{EN}$ 130, a clamp drive signal $U_{CD}$ 132, a clamp voltage $V_{CL}$ 136, a primary voltage $V_P$ 137, a current sense signal 129, a feedback signal $U_{FB}$ 139, a secondary control signal $U_{SR}$ 140, a request signal $U_{REQ}$ 141, a clamp current $I_{CL}$ 142, a drain voltage $V_D$ 143, a switch current $I_D$ 144, and an enable signal $U_{ESR}$ 145.

In the illustrated example, the power converter 100 is shown as having a flyback topology. Further, the input of power converter 100 is galvanically isolated from the output of power converter 100, such that input return 111 is galvanically isolated from output return 117. Since the input and output of power converter 100 are galvanically isolated, there is no direct current (dc) path across the isolation barrier of energy transfer element T1 106, or between primary winding 108 and secondary winding 110, or between input return 111 and output return 117. It is appreciated that other known topologies and configurations of power converters may also benefit from the teachings of the present disclosure.

The power converter 100 provides output power to a load 118 from an unregulated input $V_{IN}$ 102. In one embodiment, the input voltage $V_{IN}$ 102 is a rectified and filtered ac line voltage. In another embodiment, the input voltage $V_{IN}$ 102 is a dc input voltage. The input voltage $V_{IN}$ 102 is coupled to the energy transfer element 106. In some embodiments, the energy transfer element 106 may be a coupled inductor, transformer, or an inductor. The example energy transfer element 106 is shown as including two windings, a primary winding 108 and secondary winding 110. When the power switch S1 112 is ON, the primary voltage $V_P$ 137 is substantially equal to the negative sum of the input voltage $V_{IN}$ 102, or mathematically:

$$V_P = -V_{IN}.$$

When the power switch S1 112 is OFF, the primary voltage $V_P$ 137 is substantially equal to the reflected output voltage of the secondary winding 110. The primary winding 108 of the energy transfer element is further coupled to the power switch S1 112 and the power switch S1 112 is further coupled to input return 111. The voltage at the drain of the power switched S1 112 is denoted as drain voltage $V_D$ 143, which is also the voltage across the parasitic capacitance $C_{P1}$ 127.

Coupled across the primary winding 108 is the active clamp circuit 104. The active clamp circuit 104 is shown as including clamp capacitance $C_{CL}$ 122 which is coupled to the active clamp switch 123, diodes 124, and 125. Diode 124 is coupled to one end of the clamp capacitor $C_{CL}$ 122. The active clamp switch 123 is exemplified as a transistor with a body diode (anti-parallel diode). As shown, the active clamp switch 123 is shown as a metal-oxide field effect transistor (MOSFET) but it should be appreciated that other transistors may be used. It is appreciated that the active clamp switch 123 could also be in a cascode configuration in which a low voltage transistor is coupled to a high voltage junction field effect transistor (JFET). The JFET transistor can comprise of gallium nitride (GaN) or silicon carbide (SiC) material.

The active clamp switch 123 is coupled such that the drain of the transistor is coupled to the clamp capacitance $C_{CL}$ 122 while the source of the active clamp switch 123 is coupled to the anode of diode 125. The cathode of diode 124 is coupled to the clamp capacitance $C_{CL}$ 122.

The voltage across the clamp capacitance $C_{CL}$ 122 is denoted as the clamp capacitance voltage $V_{CL}$ 136 and the current in the clamp circuit is denoted as clamp current $I_{CL}$ 142.

The active clamp circuit 104 limits the maximum voltage on the power switch S1 112. Further, control of the active clamp switch 123 of the active clamp circuit 104 facilitates zero voltage switching of the power switch S1 112. In addition, the active clamp circuit 104 may reduce root-mean square (RMS) current in the power converter 100. Diodes 124 and 125 may be utilized to control the clamp current $I_{CL}$ 142 flow to the clamp capacitor $C_{CL}$ 122.

The active clamp circuit 104 is coupled to receive the clamp drive signal $U_{CD}$ 132 from the first controller 120. The active clamp switch 123 is controlled to turn on to inject current into the primary winding 108. The active clamp switch 123 is turned on for a first duration prior to the power switch S1 112 turning on. In other words, the active clamp switch 123 is not turned on for the entire duration that the power switch S1 112 is turned off. At or near the beginning of the off-time of the power switch S1 112, the diode 124 conducts the charge associated with the uncoupled inductance of the power converter 100. In one example, the diode 124 conducts when the drain voltage $V_D$ 143 increases to a high enough voltage to forward biases the diode 124 of the active clamp circuit 104. The drain voltage $V_D$ 143 increases at or near the beginning of the off-time of the power switch S1 112. Diode 125 blocks the charge associated with the uncoupled inductance from conducting. The charge from the uncoupled inductance is transferred to the clamp capacitance $C_{CL}$ 122 through the diode 124 and is stored. The diode 124 stops conducting substantially after the net charge associated with uncoupled inductance of the power converter 100 has been transferred.

The active clamp switch 123 remains OFF until near the end of the OFF time of the power switch S1 112. It is appreciated in other examples, a non-active clamp such as a resistor-clamp-diode (RCD) clamp could be applied as well instead of the active clamp switch 123. Once it is determined that the power switch should turn ON, the active clamp switch 123 is turned ON for a first duration of time. The turn on of the active clamp switch 123 occurs prior to the turn on of the power switch S1 112, near the end of the off-time of the power switch S1 112. The transistor of the active clamp switch 123 is turned on such that the net charge previously transferred to the clamp capacitance C1 144 associated with the uncoupled is transferred to the primary winding 108. As such, the energy associated with the uncoupled inductance is returned to the system rather than being dissipated. In one example, the uncoupled inductance represents the leakage inductance of the energy transfer element 106. The active clamp switch 123 is controlled such that the leakage energy is reset and returned to the power converter rather than being dissipated.

Secondary winding 110 is coupled to the SR switch 114. Output capacitor $C_O$ 116 is shown as being coupled to the SR switch 114 and the output return 117. The power converter 100 further includes circuitry to regulate the output, which in one example may be the output voltage $V_O$ 138, output current $I_O$ 107, or a combination of the two. A feedback signal $U_{FB}$ 139 representative of the output of the power converter 100 is provided to the second controller 121.

The second controller 121 is coupled to receive the feedback signal $U_{FB}$ 139, representative of the output of the power converter 100 and outputs the secondary control signal $U_{SR}$ 140 and the request signal $U_{REQ}$ 141. The secondary drive signal $U_{SR}$ 126 is received by the SR switch 114 and controls the turn on and turn off SR switch 114. The request signal $U_{REQ}$ 141 is representative of a request to turn on the power switch S1 112. The request signal $U_{REQ}$ 141 may include request events which are generated in response to the feedback signal $U_{FB}$ 139. In one example, the request signal $U_{REQ}$ 141 may include request events which are generated in response to a comparison of the feedback signal $U_{FB}$ 139 to a target value. The request signal $U_{REQ}$ 141 may be a rectangular pulse waveform which pulses to a logic high value and quickly returns to a logic low value. The logic high pulses may be referred to as request events.

The first controller 120 is coupled to receive the request signal $U_{REQ}$ 141 through a communication link 146, shown as a dashed line, and outputs the clamp drive signal $U_{CD}$ 132 and the drive signal $U_D$ 128. The first controller 120 provides the drive signal $U_D$ 128 to the power switch S1 112 to control various switching parameters of the power switch S1 112 to control the transfer of energy from the input of to the output of the power converter 100 through the energy transfer element 106. Example of such parameters include switching frequency (or switching period), duty cycle, on-time and off-times, or varying the number of pulses per unit time of the power switch S1 112. In addition, the power switch S1 112 may be controlled such that it has a fixed switching frequency or a variable switching frequency. In one example of variable switching frequency control, the switching frequency may be reduced for light-load or no-load conditions.

The second controller 121 and the first controller 120 may communicate via the communication link 146. For the example shown, the second controller 121 is coupled to the secondary side of the power converter 100 and is referenced to the output return 117 while the first controller 120 is coupled to the primary side of the power converter 100 and is referenced to the input return 111. The regulation control 133 is referenced to the input return 111. In embodiments, the first controller 120 and the second controller 121 are galvanically isolated from one another and the communication link 146 provides galvanic isolation using an inductive coupling, such as a transformer or a coupled inductor, an optocoupler, capacitive coupling, or other device that maintains the isolation. However, it should be appreciated that in some embodiments, the second controller 121 is not galvanically isolated from the first controller 120.

In one example, the first controller 120 and second controller 121 may be formed as part of an integrated circuit that is manufactured as either a hybrid or monolithic integrated circuit. In one example, the power switch S1 112 may also be integrated in a single integrated circuit package with the first controller 120 and the second controller 121. In addition, in one example, the first controller 120 and second controller 121 may be formed as separate integrated circuits. The power switch S1 112 may also be integrated in the same integrated circuit as the first controller 120 or could be formed on its own integrated circuit. Further, it should be appreciated that both the first controller 120, the second controller 121 and power switch S1 112 need not be included in a single package and may be implemented in separate controller packages or a combination of combined/separate packages.

It is generally understood that a switch that is closed may conduct current and is considered on, while a switch that is open cannot conduct current and is considered off. In one example, the power switch S1 112 may be a transistor such as a metal-oxide-semiconductor field-effect transistor (MOSFET), bipolar junction transistor (BJT), SiC based transistor, GaN based transistor, or an insulated-gate bipolar transistor (IGBT).

The first controller 120 includes the clamp control circuit 131 and the regulation control circuit 133. As shown, regulation control circuit 133 is coupled to receive the request signal $U_{REQ}$ 141 and outputs the drive signal $U_D$ 128, which controls the switching of power switch S1 112, and the clamp enable signal $U_{EN}$ 130. In one example, the clamp enable signal $U_{EN}$ 130 may be representative of when the power switch S1 112 is going to be enabled (or turned ON). Or in other words, the clamp enable signal $U_{EN}$ 130 may be representative of a determination to turn ON the power switch S1 112. Or in other words, the clamp enable signal $U_{EN}$ 130 is representative of enabling the active clamp switch 123 to turn on.

Clamp control circuit 131 is coupled to receive the clamp enable signal $U_{EN}$ 130 and outputs the clamp drive signal $U_{CD}$ 132. The clamp drive $U_{CD}$ 132 controls various switching parameters of the active clamp switch 123, such as the on-times or off-times of the active clamp switch 123. In one embodiment, the clamp drive signal $U_{CD}$ 132 is a rectangular pulse waveform with varying durations of logic high and logic low sections, logic high sections corresponding to the active clamp switch 123 being on and logic low sections corresponding to the active clamp switch 123 being off.

In one example, the clamp control circuit 131 via the clamp drive signal $U_{CD}$ 132 controls the amount of current provided to the primary winding 108 such that the net charge associated with the uncoupled inductor is transferred to the primary winding 108.

The regulation control circuit 133 is also coupled to receive the clamp drive signal $U_{CD}$ 132 and outputs the drive signal $U_D$ 128. As shown, the regulation control circuit 133 is also coupled to receive the current sense signal 129 representative of the switch current $I_D$ 144 of power switch S1 112. In embodiments, the regulation control circuit 133 turns on the power switch S1 112 after the clamp drive signal $U_{CD}$ 132 indicates that the active clamp switch 123 has been turned off. Or in other words, the regulation control circuit outputs the drive signal $U_D$ 128 to turn on the power switch S1 112 after a trailing edge in the clamp drive signal $U_{CD}$ 132. Further, the regulation control circuit 133 does not turn on the power switch S1 112 until a second duration of time has passed after the active clamp switch 123 has turned off. The second duration of time may be selected to provide sufficient time for the drain voltage $V_D$ 143 to fall to substantially zero (or in other words, to provide sufficient time for the parasitic capacitance $C_{P1}$ 127 to discharge completely to the primary winding 108) before power switch S1 112 is turned on, this allowing for zero voltage switching of the power switch S1 112. In one embodiment, the regulation control circuit 133 may turn off the power switch S1 112 when the switch current $I_D$ 144 provided by the current sense signal 129 reaches a current limit.

The second controller 121 is configured to output the secondary control signal $U_{SR}$ 140 to control the SR switch 114 and generate the request signal $U_{REQ}$ 141 to turn on the power switch S1 114. The second controller 121 comprises a discharge prevention circuit 134 and a request control circuit 135. The request control circuit 135 is coupled to receive the feedback signal $U_{FB}$ 139 and generate a request signal $U_{REQ}$ 141 when the output of the power converter (i.e. output voltage, output current, or a combination of both) falls below a regulation value. The period of generated request signals $U_{REQ}$ 141 can vary with the load conditions. For example at full load, the period of the request signals $U_{REQ}$ 141 will be shorter with respect to the period of request signals $U_{REQ}$ 141 at light to no load conditions.

To detect and prevent the transfer of energy from the secondary winding to the primary winding during light or no load conditions, the discharge prevention circuit 134 is coupled to receive the request signal $U_{REQ}$ 141 and generate an enable signal $U_{ESR}$ 145 to control the enable switch 109. The enable switch 109 could also be referred to as a prevent switch. The enable signal $U_{ESR}$ 145 could also be referred as prevent signal that prevents the secondary control signal from controlling the SR switch by controlling the prevent switch. When the enable signal $U_{ESR}$ 145 is a logic high, the enable switch 109 is closed and the secondary control signal $U_{SR}$ 140 is able to control the SR switch 114. When the enable signal $U_{ESR}$ 145 is a logic low, the enable switch 109 is open and prevents the secondary control signal $U_{SR}$ 140 from turning on the SR switch 114. The discharge prevention circuit 134 generates a logic low of the enable signal $U_{ESR}$ 145 in response to a period of the request signal $U_{REQ}$ 141 being greater than a first timed threshold, and generates a logic high of the enable signal $U_{ESR}$ 145 in response to a period of the request signal being less than a second timed threshold. In one example, the first timed threshold can be in the range of 1 milliseconds. In one example, the second timed threshold can in the range of 2 milliseconds.

As will be explained in FIG. 2, the prevention of turning on SR switch 114 eliminates a discharging of the capacitance $C_{P1}$ 127 which can cause the drain voltage $V_D$ 143 to go below ground temporarily.

Figure 2:
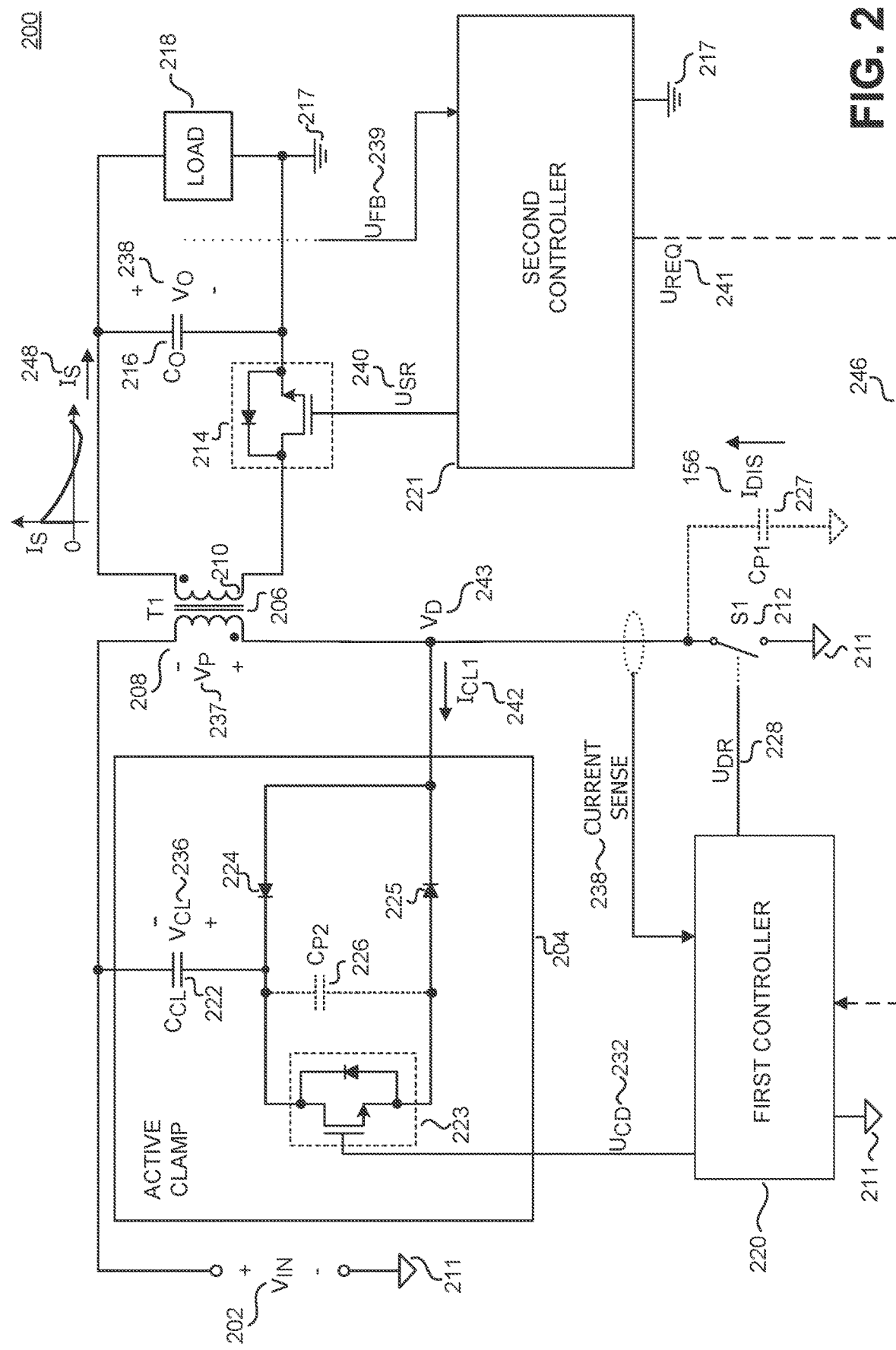
FIG. 2 illustrates one example of a power converter whereby a parasitic capacitance of a power switch discharges due to the turn on of the synchronous rectifier, according to some embodiments of the present disclosure.

FIG. 2 illustrates one example of a power converter whereby a parasitic capacitance of a power switch discharges due to the turn off the synchronous rectifier in accordance with the teachings of the present disclosure. It is appreciated that the signals mentioned of FIG. 2 may be one example of signals of FIG. 1, and that similarly named and numbered elements referenced below are coupled and function similar to as described above.

The example power converter 200 illustrates the cause of discharging of the output capacitance $C_{P1}$ 227 of the power switch S1 212, which can occur during light or no load conditions. During light or no load conditions, the clamp capacitor $C_{CL}$ 222 is not being sufficiently charged and can cause improper operation throughout the power converter 200. In one example, the clamp capacitor $C_{CL}$ 222 discharges to zero volts. The effect can be after a turn off of the power switch S1 212, a majority of energy is instead used to charge the clamp capacitor $C_{CL}$ 222 instead of transferring from the primary winding 108 to the secondary winding 210. As a result, the second controller 221 may fail to turn on the SR switch 214 if a change in polarity in voltage across the secondary winding 210 is not detected.

In another example, the clamp capacitor $C_{CL}$ 222 could have a voltage, but not high enough for normal operation. After a turn off of the power switch S1 212, some energy is used to charge the clamp capacitor $C_{CL}$ 222, and the majority of energy is transferred from the primary winding 208 to the secondary winding 210. The second controller 221 correctly detects a polarity in voltage across the secondary winding 210. The second controller 221 outputs a secondary control signal $U_{SR}$ 240 for a minimum on-time. When energy is transferred, the output capacitor $C_O$ 216 is charged via the secondary current $I_S$ 248 when SR switch 214 is turned on. Due to minimum on time of the SR switch 214, as the secondary current $I_S$ 248 decreases, the secondary current $I_S$ 248 can reach a negative value and the output capacitor $C_O$ 216 will begin to discharge and charge the secondary winding 210. When the SR switch 214 turns off, energy is transferred back from the secondary winding 210 to the primary winding 208. The current discharge $I_{DIS}$ 256 represents why the drain voltage $V_D$ 156 can dip to zero value briefly due to the parasitic capacitance $C_{P1}$ 227 of the power switch S1 212 discharging. The second controller 221 is designed to prevent the discharging of the parasitic capacitance of the power switch caused by the minimum on time of the SR switch 214, by not allowing the secondary control signal $U_{SR}$ 240 to control the SR switch 214 in response to the request signal $U_{REQ}$ 241.

Figure 3:
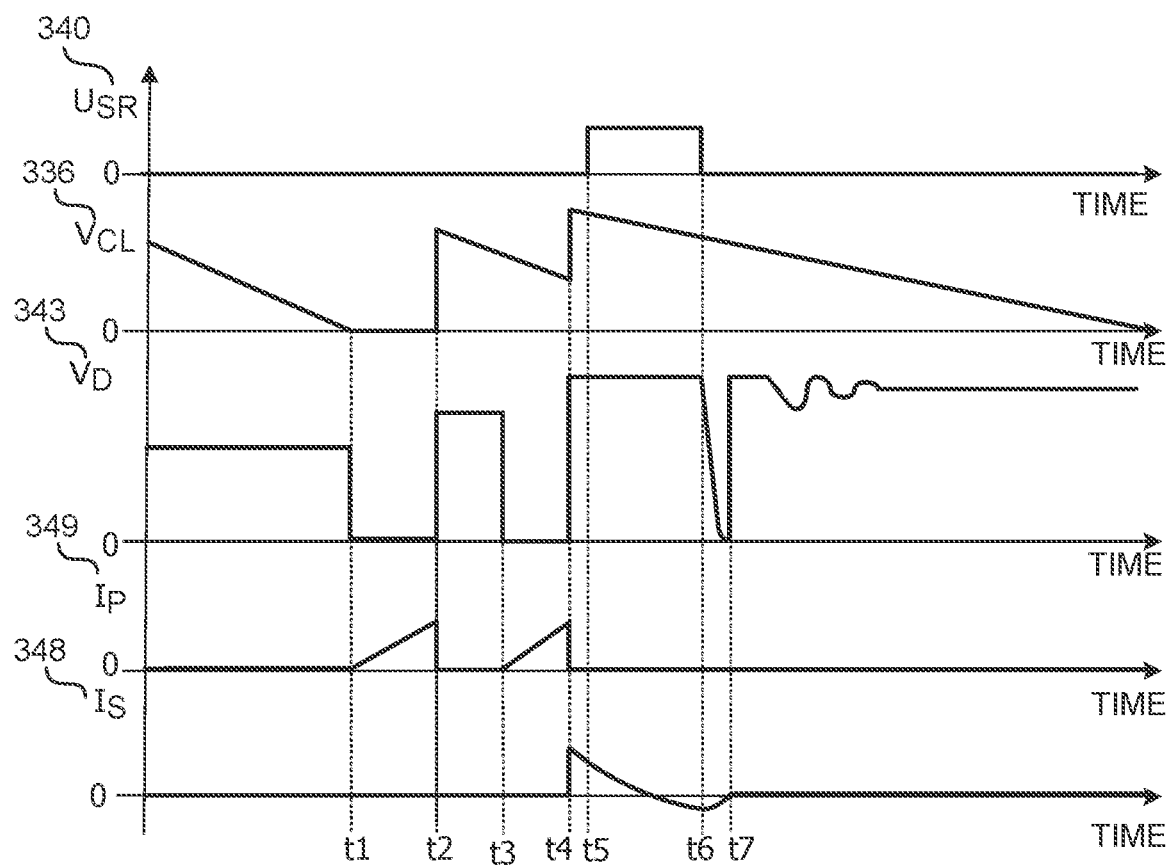
FIG. 3 illustrates a timing diagram illustrating a secondary control signal, a clamp voltage, a drain to source voltage, a primary current, and a secondary current, according to some embodiments of the present disclosure.

FIG. 3 illustrates a timing diagram illustrating a secondary control signal, a clamp voltage, a drain voltage, a primary current of the primary winding, and a secondary current in accordance with the teachings of the present disclosure. It is appreciated that the signals mentioned of FIG. 3 may be one example of signals of FIG. 1, and that similarly named and numbered elements referenced below are coupled and function similar to as described above.

The first timing diagram illustrates a secondary control signal $U_{SR}$ 340. The second timing diagram illustrates a clamp voltage $V_{CL}$ 335. The third timing diagram illustrates a drain voltage $V_D$ 343. The fourth timing diagram illustrates a primary current $I_P$ 349. The fifth timing diagram illustrates secondary current $I_S$ 348 enable signal $U_{CE}$ 468.

In the example of FIG. 3, the power converter is in a light or no load condition. At time before t1, the power switch is turned off, such that the drain voltage $V_D$ 343 is a non-zero value. The clamp voltage $V_{CL}$ 336 is a non-zero value and decreasing linearly. The secondary control signal $U_{SR}$ 340 is logic low. The primary current $I_P$ 349 is zero as energy is transferred to the secondary winding. The secondary current $I_S$ 348 is zero.

At time t1, the power switch is turned on, as denoted by drain voltage $V_D$ 343 at zero. The secondary control signal $U_{SR}$ 340 is logic low as the SR switch is turned off. The primary current $I_P$ 349 begins to ramp up as the primary winding is being charged. The clamp voltage $V_{CL}$ 336 is at zero volts. The secondary current $I_S$ 348 is at zero.

At time t2, the power switch turns off, as denoted by a non-zero drain voltage $V_D$ 343. The clamp capacitor voltage $V_{CL}$ 336 rises from zero to a non-zero value. As mentioned previously, the second controller does not detect a change in polarity of the voltage across the secondary windings, the secondary control signal $U_{SR}$ 340 does not transition to logic high. Therefore, the secondary current $I_S$ 348 is zero.

At time t3, the power switch is turned on, as denoted by drain voltage $V_D$ 343 at zero. The secondary control signal $U_{SR}$ 340 is logic low as the SR switch is turned off. The primary current $I_P$ 349 begins to ramp up as the primary winding is being charged. The clamp voltage $V_{CL}$ 336 is at a non-zero value. The secondary current $I_S$ 348 is at zero.

At time t4, the power switch is turned off, as denoted by a sharp rise in the drain voltage $V_D$ 343. The clamp voltage $V_{CL}$ 336 rises due the drain voltage charging the clamp capacitor. The primary current $I_P$ 349 goes to zero as energy is transferred from the primary winding to the secondary winding. The secondary current $I_S$ 348 rises.

At time t5, the drain voltage $V_{DS}$ 343 is a non-zero value with a slope of zero. The secondary control signal $U_{SR}$ 340 transitions to a logic high, which turns on the synchronous rectifier. The secondary current $I_S$ 348 begins to decrease towards zero. The clamp voltage $V_{CL}$ 336 is a non-zero value. The primary current $I_P$ 349 is zero.

At time t6, the secondary current $I_S$ 348 is a negative value. The output capacitor begins to discharge, and charge the secondary winding. The secondary control signal $U_{SR}$ 340 transitioning to a logic low can cause the parasitic capacitance of the power switch to discharge. The primary current $I_P$ 349 is zero. The clamp voltage $V_{CL}$ 336 is a non-zero value.

At time after t6 and before t7, the drain voltage $V_D$ 343 dips to zero caused by energy transfer from the secondary winding to the primary winding. The secondary control signal $U_{SR}$ 340 is logic low. The clamp voltage $V_{CL}$ 336 is a non-zero value. The primary current $I_P$ 349 is zero. The secondary current $I_S$ 348 is a negative value.

At time t7, the drain voltage $V_D$ 343 rises sharply. The clamp voltage Vu 336 is a non-zero value. The secondary control signal $U_{SR}$ 340 is logic low. The primary current $I_P$ 349 is zero. The secondary current $I_S$ 348 is zero.

After time t7, the secondary control signal $U_{SR}$ 340 is a logic low. The clamp voltage $V_{CL}$ 336 is decreasing linearly. The drain voltage $V_D$ 343 oscillates, but is above zero. The primary current $I_P$ 349 is zero. The secondary current $I_S$ 348 is zero.

Figure 4:
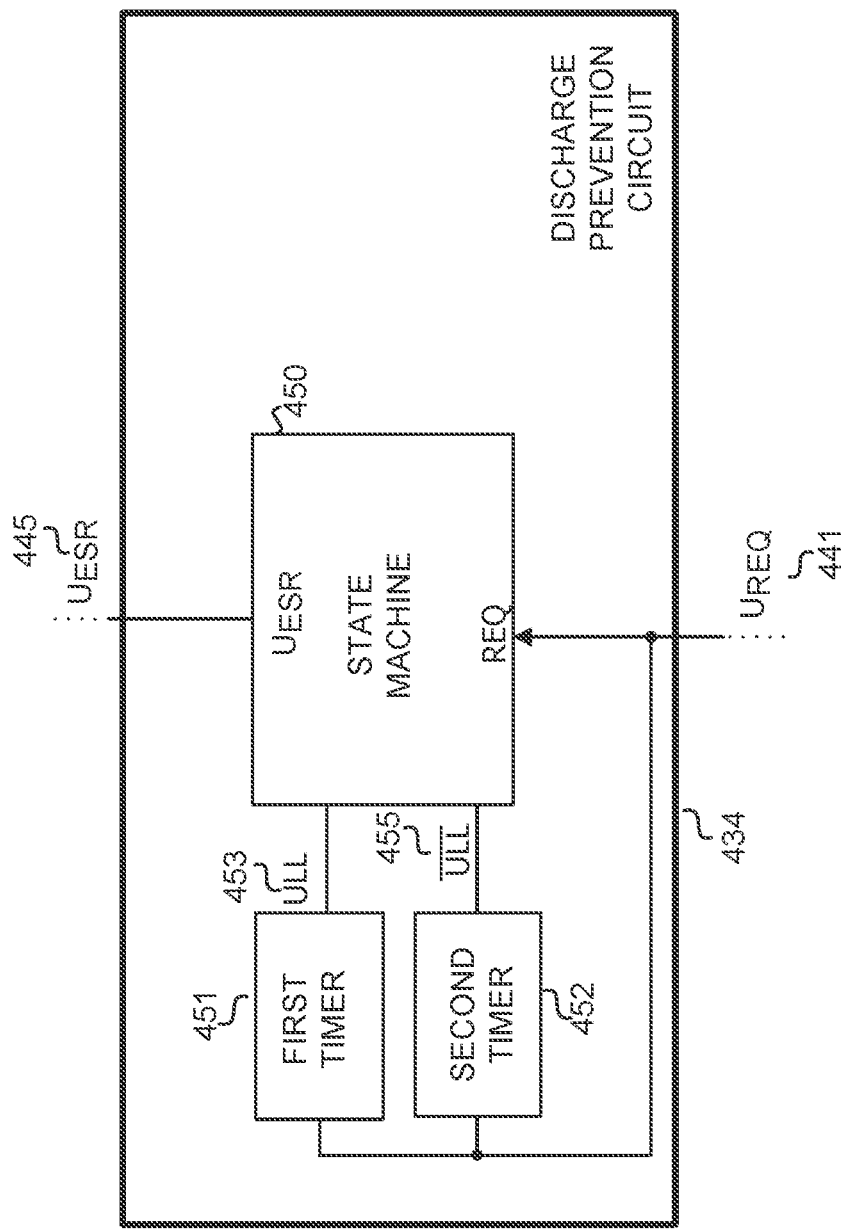
FIG. 4 illustrates one example of a discharge prevention circuit as shown in FIG. 1, according to some embodiments of the present disclosure.

FIG. 4 illustrates one example of a disable circuit as shown in FIG. 1 in accordance with the teachings of the present disclosure. It is appreciated that the signals mentioned of FIG. 4 may be one example of signals of FIG. 1, and that similarly named and numbered elements referenced below are coupled and function similar to as described above.

The discharge prevention circuit 434 is coupled to receive the request signal $U_{REQ}$ 441 and generate an enable signal $U_{ESR}$ 445 to control the enable switch, which allows the secondary control signal to control the SR switch. The discharge prevention circuit 434 determines if the period of the request signal $U_{REQ}$ 441 is greater than a timed threshold that would indicate the power converter is in a light load or no load condition. The discharge prevention circuit 434 disables the enable switch until consecutive actions of the request signal $U_{REQ}$ 441 is below a second time threshold that would indicate the power converter is no longer in light or no load condition. The discharge prevention circuit 434 comprises a state machine 450, a first timer 451, and a second timer 452.

The first timer 451 is coupled to receive the request signal $U_{REQ}$ 441 and generate a light load signal ULL 453 in response to the period of the request signal $U_{REQ}$ 441 being greater than a time threshold of the first timer 451. The second timer 452 is coupled to receive the request signal $U_{REQ}$ 441 and generate an inverse light load signal $\overline{ULL}$ 455 in response to the period of the request signal $U_{REQ}$ 441 being less than a second time threshold. The state machine 450 is coupled to receive the request signal $U_{REQ}$ 441, the light load signal ULL 453 453, the inverse light load signal $\overline{ULL}$ 455, and generate an enable signal $U_{ESR}$ 445. The state machine 450 comprises a plurality of states to determine if the enable switch is to be opened or closed. The default state of the state machine is the normal operation state. The second state is a light load operation state during which the enable signal is in a first state. In one example, the first state of the enable signal can be logic low. The third state is a reset count state. The fourth state is a detection state. The explanation of each state will be described below.

In operation, the default state of the state machine 450 is the normal operation state. The state machine 450 is configured to remain in the normal operation state in response to the inverse light load signal $\overline{ULL}$ 455. Therefore, the state machine 450 generates a second state of the enable signal $U_{ESR}$ 445. In one example, the second state of the enable signal $U_{ESR}$ 445 can be a logic high. The first state of the light load signal ULL 453 can be logic low. The first state of the inverse light load signal $\overline{ULL}$ 455 is logic high. In the normal operation state, the enable switch is closed, which allows the secondary control signal to control the SR switch.

The state machine 450 is further configured to transition to a light load operation state in response to the second state of the light load signal ULL 453. The second state of the light load signal ULL 453 can be logic high. The second state of the enable signal $U_{ESR}$ 445 can be logic low. The second state of the inverse light load signal $\overline{ULL}$ 455 can be logic low. The secondary control signal is not allowed to control the SR switch.

The state machine 450 is further configured to transition from the light load operation state to a reset count state during which a count signal internal to the state machine 450 (not shown) is set to zero in response to the light load signal ULL 453 and the request signal $U_{REQ}$ 441. Afterwards, the state machine 450 transitions back to the light load operation state. The state machine 450 can also transition to a detection state in response to the inverse light load signal $\overline{ULL}$ 455 and the request signal $U_{REQ}$ 541. In the detection state, the enable signal $U_{ESR}$ 445 can be logic low. The count signal is incremented and checked against a count threshold. If the count signal is equal to the count threshold, the state machine 450 is configured to transition to the normal operation mode. If the count signal is not equal to the count threshold, the state machine 450 transitions back to the light load operation state. The count threshold is representative of consecutive events that a period of request signal is found to be less than a second time threshold provides hysteresis to prevent a false triggering of the enable switch when the power converter could still be in a light or no load condition.

In the case where the count signal is not equal to the count threshold, the state machine 450 generates the first state of the enable signal $U_{ESR}$ 445. Therefore, the enable signal $U_{ESR}$ 445 can be logic low. The enable switch is open, and the secondary control signal is not allowed to control the SR switch.

In the case where the count signal is equal to the count threshold, the state machine 450 transitions to the normal operation state, and generates a second state of the enable signal $U_{ESR}$ 445. The enable signal $U_{ESR}$ 445 is a logic high. The enable switch is closed, and the secondary control signal is not allowed to control the SR switch.

Figure 5:
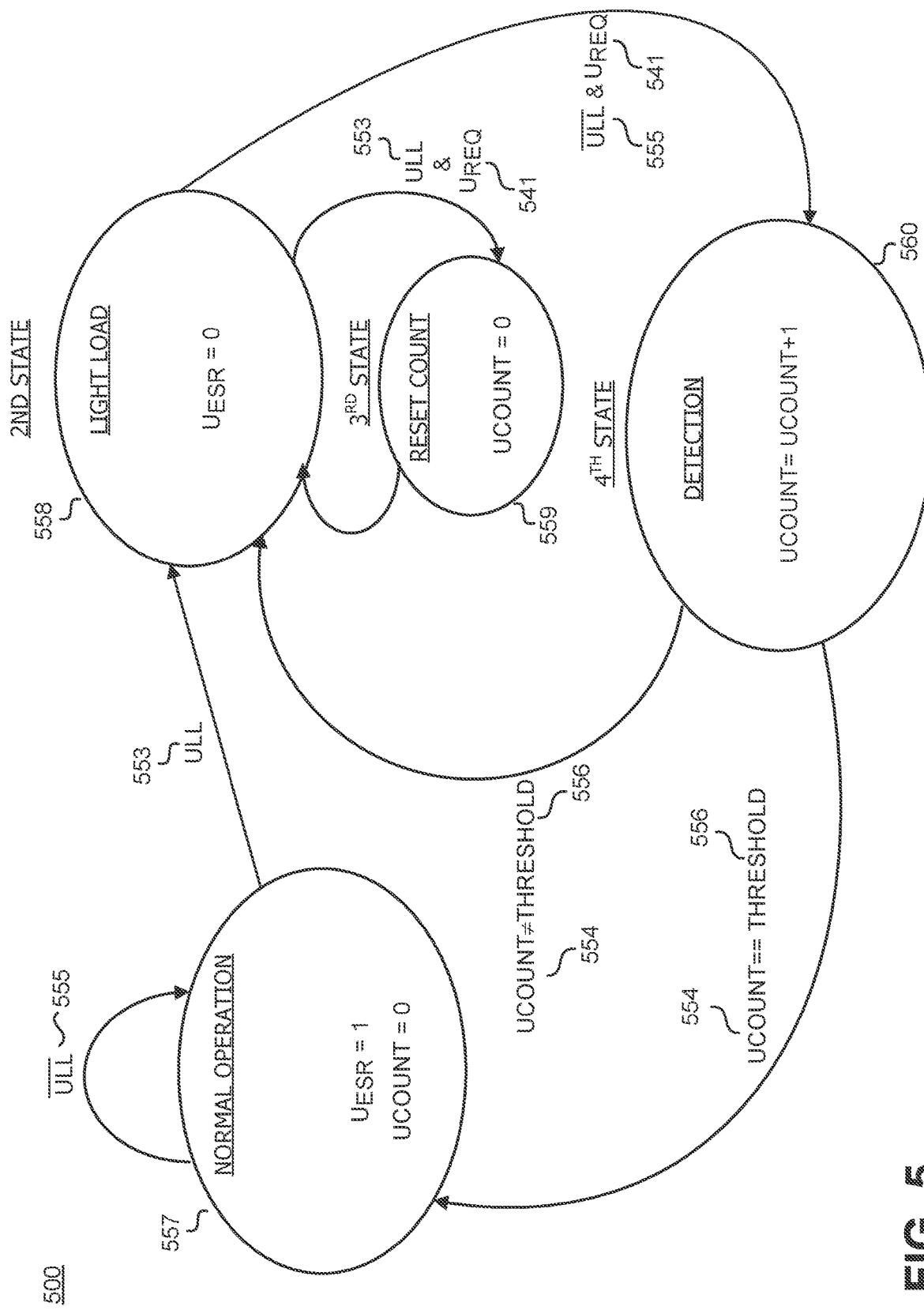
FIG. 5 illustrates one example of a state machine diagram of the discharge prevention circuit of FIG. 4, according to some embodiments of the present disclosure.

FIG. 5 illustrates one example of a state machine diagram of the discharge prevention circuit of FIG. 4 in accordance with the teachings of the present disclosure. It is appreciated that the signals mentioned of FIG. 5 may be one example of signals of any of the previous figures, and that similarly named and numbered elements referenced below are coupled and function similar to as described above.

The diagram of state machine 500 includes a normal operation state 557, a light load operation state 558, a reset count state 559, and a detection state 560. The state machine 500 is configured to transition to the various states in response to the request signal, the light load signal ULL 553, the count signal UCOUNT 554, and the inverse light load signal $\overline{ULL}$ 555. In the normal operation state, the enable signal $U_{ESR}$ is logic high and the count signal UCOUNT 554 is logic low, and the enable switch is closed to allow the secondary control signal to turn on the synchronous rectifier. The state machine 500 remains in the normal operation state 557 so long as the inverse light load signal $\overline{ULL}$ 555 is logic high. The inverse light load signal $\overline{ULL}$ 555 is representative of a period of a request signal that is below a second time threshold representative of the power converter that is not in a light or no load condition.

The state machine 500 is configured to transition to the light load operation state 558 in response to a light load signal ULL 553. The light load signal ULL 553 is generated in response to a period of the request signal $U_{REQ}$ 541 that is greater than a timed threshold that represents the power converter is in a light or no load condition. In the light load operation state 558, the enable signal $U_{ESR}$ is a logic low.

The state machine 500 is configured to transition to the reset count state 559 in response to a light load signal ULL 553 and a request signal $U_{REQ}$ 541. In the reset count state, the count signal UCOUNT 554 is reset to zero. The state machine 500 is configured to transition back to the light load operation state 559.

The state machine 500 is configured to transition from the light load operation state 558 to the detection state 560 in response to the inverse light load signal $\overline{ULL}$ 555 and the request signal $U_{REQ}$ 541. In the detection state 560, the enable signal can be a logic low. The count signal UCOUNT 554 is incremented. If the count signal UCOUNT 554 is equal to a count threshold 556, the state machine 500 transitions to the normal operation state 557. If the count signal UCOUNT 554 is not equal to the count threshold 556, the state machine 500 transitions to the light load operation state 558. As mentioned previously, if a light load signal ULL 4553 and a request signal $U_{REQ}$ 543 is received in the light load operation state 558, the state machine 500 transitions to the reset count state 559, where the count is reset to zero.

Figure 6:
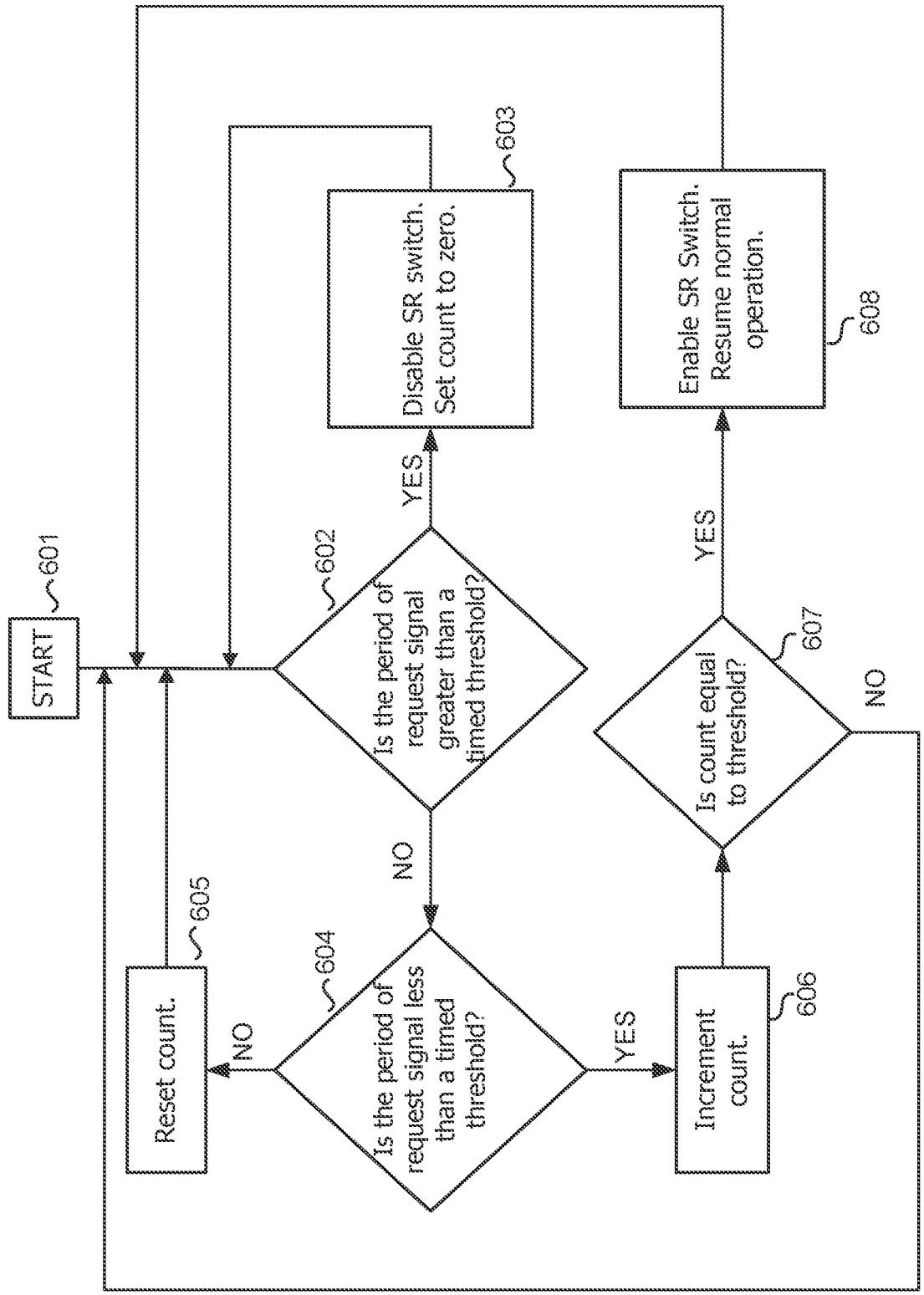
FIG. 6 illustrates a flowchart illustrating a prevention of the discharge of the power switch, according to some embodiments of the present disclosure.

FIG. 6 illustrates an example flow diagram representing one example of controlling an enable switch in response to the request signal to allow the secondary control signal to control the synchronous rectifier in accordance with the teachings of the present disclosure. The order in which some or all of the process blocks appear in process 400 should not be deemed limiting. Rather, one of ordinary skill in the art having the benefit of the present disclosure will understand that some of the process blocks may be executed in a variety of orders not illustrated, or even in parallel.

Process 600 begins at start block 601 and transitions to decision block 602. At decision block 603, the discharge prevention circuit determines if the request signal is greater than a timed threshold, the timed threshold representative that the power converter is in a light or no load condition. If so, then process 600 proceeds to block 603. At block 603, the secondary control signal is not allowed to control the SR switch as the enable switch is opened, which disables control of the SR switch. The count signal is set to zero. If the condition is not true, process 600 proceeds to decision block 604.

At decision block 604, the discharge prevention circuit determines if the period of request signal is less than a timed threshold. If the condition is not true, the count is reset and process 600 loops back to decision block 602. The SR switch remains disabled. If the condition is true, process 600 proceeds to process block 606. At process block 606, the count signal is incremented. Process 600 proceeds to decision block 607. At decision block 607, the discharge prevention circuit determines if the count signal is equal to the count threshold. If the condition is not true, process 600 loops back to decision block 602. If the condition is true, process 600 proceeds to decision block 608. At decision block 608, the enable switch is enabled, which allows the secondary control signal to control the SR switch. The power converter is in now in normal operation. Process 600 transitions back to decision block 602.

The above description of illustrated examples of the present invention, including what is described in the Abstract, are not intended to be exhaustive or to be limitation to the precise forms disclosed. While specific embodiments of, and examples for, the invention are described herein for illustrative purposes, various equivalent modifications are possible without departing from the broader spirit and scope of the present invention. Indeed, it is appreciated that the specific example voltages, currents, frequencies, power range values, times, etc., are provided for explanation purposes and that other values may also be employed in other embodiments and examples in accordance with the teachings of the present invention.

Although the present invention is defined in the claims, it should be understood that the present invention can alternatively be defined in accordance with the following examples:

Example 1: A power converter, comprising: an energy transfer element coupled between an input of the power converter and an output of the power converter; a power switch coupled to the energy transfer element; an active clamp switch coupled to the energy transfer element and the power switch; a first controller coupled to the active clamp switch and the power switch; and a second controller configured to control a synchronous rectifier switch; the second controller further configured to generate a request signal in response to the output of the power converter being below a threshold, the second controller comprising: a request control circuit configured to generate the request signal, the request control circuit further configured to generate a secondary control signal to control the synchronous rectifier switch; and a discharge prevention circuit configured to prevent a parasitic capacitance discharge of the power switch caused by a turn on of the synchronous rectifier switch, the discharge prevention circuit further configured to generate a first state of a prevent signal to disable the secondary control signal from control of the synchronous rectifier switch when a period of the request signal is greater than a first time threshold, the discharge prevention circuit further configured to generate a second state of the prevent signal to enable the secondary control signal to control the synchronous rectifier switch when the period of the request signal is less than a second time threshold.

Example 2: The power converter of Example 1, the second controller comprising a prevention switch coupled to receive the prevent signal to prevent the parasitic capacitance discharge of the power switch caused by a turn on of the synchronous rectifier switch, the prevention switch further coupled to receive the prevent signal to enable the secondary control signal to control the synchronous rectifier switch when the period of the request signal is less than a second time threshold.

Example 3: The power converter of any of the previous examples, wherein the discharge prevention circuit comprises: a first timer circuit coupled to generate a light load signal in response to the period of the request signal being greater than the first time threshold; a second timer circuit coupled to generate an inverse light load signal in response to the period of the request signal being less than the second time threshold; and a discharge prevention state machine configured to generate the prevent signal according to a plurality of discharge prevention states in response to the request signal, the light load signal, and the inverse light load signal.

Example 4: The power converter of any of the previous examples, wherein the plurality of discharge prevention states comprises: a normal operation state during which the prevent signal is in a first state, wherein the normal operation state is a default state; a light load operation state during which the prevent signal is in a second state; and a detection state during which a count signal is incremented and the discharge prevention state machine transitions to the normal operation state when the count signal is equal to a count threshold.

Example 5: The power converter of any of the previous examples, the discharge prevention state machine further configured to transition from the normal operation state to the light load operation state in response to the light load signal.

Example 6: The power converter of any of the previous examples, the discharge prevention state machine further configured to transition from the light load operation state to a reset count state in response to the light load signal and the request signal, wherein during the reset count state the count signal is set to zero and the discharge prevention state machine transitions back to the light load operation state.

Example 7: The power converter of any of the previous examples, the discharge prevention state machine further configured to remain in the normal operation state in response to the inverse light load signal.

Example 8: The power converter of any of the previous examples, the discharge prevention state machine further configured to transition to the detection state in response to the inverse light load signal and the request signal, wherein during the detection state the count signal is incremented and the discharge prevention state machine transitions to the light load operation state in response to the count signal not being equal to the count threshold.

Example 9: The power converter of any of the previous examples, the discharge prevention state machine further configured to transition to the normal operation state in response to the count signal being equal to the count threshold.

Example 10: The power converter of any of the previous examples, a regulation control circuit configured to generate a drive signal in response to the request signal to transfer energy from the input of the power converter to the output of the power converter; and a clamp control circuit configured to control an active clamp switch to inject charge stored in a clamp capacitor into an energy transfer element to discharge a parasitic capacitance of the power switch into the energy transfer element before the power switch is turned on.

Example 11: The power converter of any of the previous examples, wherein the second controller is galvanically isolated from the first controller.

Example 12: The power converter of any of the previous examples, wherein the turn on of the synchronous rectifier switch is configured to generate a negative secondary current in a secondary winding of the energy transfer element, wherein a turn off of the synchronous rectifier switch transfers energy from the secondary winding to a primary winding of the energy transfer element such that a parasitic capacitance of the power switch discharges.

Example 13: A method for controlling a power converter, comprising: receiving a request signal representative of an output of a power converter; comparing a period of the request signal to a first time threshold; responsive to the period of the request signal being greater than the first time threshold, disabling a enable switch to prevent a turn on of a synchronous rectifier switch from causing discharge of a parasitic capacitance discharge of a power switch, and resetting a count; responsive to the period of the request signal not being greater than the first time threshold, comparing the period of the request signal to a second time threshold; responsive to the period of the request signal not being greater than the second time threshold, resetting the count; responsive to the period of the request signal being greater than the second time threshold, incrementing the count; comparing the count to a count threshold; and responsive to the count being equal to the count threshold, enabling the enable switch to control the synchronous rectifier switch and resetting the count.

Example 14: A controller configured for use in a power converter, the controller comprising: a request control circuit coupled to receive a feedback signal representative of an output of the power converter, the request control circuit configured to generate a secondary control signal to control a secondary switch, the request control circuit further configured to generate a request signal in response to the output of the power converter being below an output reference; a discharge prevention circuit coupled to receive the request signal, the discharge prevention circuit configured to generate a first state of an enable signal in response to a period of the request signal being greater than a first time threshold, the discharge prevention circuit further configured to generate a second state of the enable signal in response to the period of the request signal being less than a second time threshold; and an enable switch coupled to receive the enable signal, wherein the first state of the enable signal blocks the secondary control signal to enable the secondary switch to prevent a parasitic capacitance discharge of a power switch caused by a turn on of the secondary switch, wherein the second state of the enable signal enables the secondary control signal to control the secondary switch.

Example 15: The controller of example 14, wherein the discharge prevention circuit comprises: a first timer coupled to generate a light load signal in response to the period of the request signal being greater than the first time threshold; a second timer coupled to generate an inverse light load signal in response of the period of the request signal being less than the second time threshold; and a discharge prevention state machine configured to generate the enable signal according to a plurality of discharge prevention states in response to the request signal, the light load signal, and the inverse light load signal.

Example 16: The controller of any of the previous examples, wherein the plurality of discharge prevention states comprises: a normal operation state during which the enable signal is in the second state and a count signal is in a first state; a light load operation state during which the enable signal is in the first state; and a detection state during which a count signal is incremented and checked to be equal to a count threshold, wherein the discharge prevention state machine transitions to the normal operation state.

Example 17: The controller of any of the previous examples, the discharge prevention state machine further configured to transition from the normal operation state to the light load operation state in response to the light load signal.

Example 18: The controller of any of the previous examples, the discharge prevention state machine further configured to transition from the light load operation state to a reset count state during which the count signal is set to zero, wherein the discharge prevention state machine transitions back to the light load operation state.

Example 19: The controller of any of the previous examples, the discharge prevention state machine further configured to remain in the normal operation state in response to the inverse light load signal.

Example 20: The controller of any of the previous examples, the discharge prevention state machine further configured to transition from the light load operation state to the detection state in response to the inverse light load signal and the request signal, wherein during the detection state the count signal is incremented, and the discharge prevention state machine transitions to the light load operation state in response to the count signal not being equal to the count threshold.

Example 21: The controller of any of the previous examples, wherein the discharge prevention state machine is configured to transition to the normal operation state in response to the count signal being equal to the count threshold.

Example 22: A power converter, comprising: an energy transfer element coupled between an input of the power converter and an output of the power converter; a power switch coupled to the energy transfer element, the power switch configured to control a transfer of energy from the input of the power converter to the output of the power converter; an active clamp switch coupled to the energy transfer element and the power switch; and a first controller coupled to the active clamp switch and the power switch; a second controller configured to control a secondary switch, the second controller further configured to generate a request signal in response to the output of the power converter being below a threshold, the second controller comprising: a request control circuit configured to generate the request signal, the request control circuit further configured to generate a secondary control signal to control the secondary switch; and a prevention switch coupled to block control of the secondary switch by the secondary control signal, the prevention switch coupled to prevent the transfer of energy from the output of the power converter to the power switch caused by a turn on of the secondary switch, the prevention switch further coupled to enable the secondary control signal to control the secondary switch when a period of the request signal is less than a second time threshold.

Example 23: The power converter of example 22, wherein the second controller further comprises a discharge prevention circuit configured to generate a first state of a prevent signal to prevent the transfer of energy from the output of the power converter to the power switch caused by the turn on of the secondary switch when the period of the request signal is greater than a first time threshold, the discharge prevention circuit further configured to generate a second state of the prevent signal to enable the secondary control signal to control the secondary switch when the period of the request signal is less than the second time threshold.

Example 24: The power converter of any of the previous examples, the discharge prevention circuit coupled to the prevention switch, the discharge prevention circuit further configured to control the prevention switch in response to the request signal.

Example 25: The power converter of any of the previous examples, wherein the discharge prevention circuit comprises: a first timer coupled to generate a light load signal in response to the period of the request signal being greater than the first time threshold; a second timer coupled to generate an inverse light load signal in response to the period of the request signal being less than the second time threshold; and a discharge prevention state machine configured to generate the prevent signal according to a plurality of discharge prevention states in response to the request signal, the light load signal, and the inverse light load signal.

Example 26: The power converter of any of the previous examples, wherein the plurality of discharge prevention states comprises: a normal operation state during which the prevent signal is in the second state and a count signal is in a first state; a light load operation state during which the prevent signal is in the first state; and a detection state during which the count signal is incremented transitions to the normal operation state when the count signal is equal to a count threshold.

Example 27: The power converter of any of the previous examples, the discharge prevention state machine further configured to transition to the light load operation state in response to the light load signal.

Example 28: The power converter of any of the previous examples, wherein the light load operation state transitions to a reset count state during which the count signal is set to zero, wherein the discharge prevention state machine transitions back to the light load operation state.

Example 29: The power converter of any of the previous examples, wherein the discharge prevention state machine is configured to remain in the normal operation state in response to the inverse light load signal.

Example 30: The power converter of any of the previous examples, the discharge prevention state machine further configured to transition to the detection state from the light load operation state in response to the inverse light load signal and the request signal, wherein during the detection state the count signal is incremented, and the count signal is compared to the count threshold, wherein the discharge prevention state machine transitions to the light load operation state in response to the count signal not being equal to the count threshold.

Example 31: The power converter of any of the previous examples, the discharge prevention state machine further configured to transition to the normal operation state in response to the count signal being equal to the count threshold.

What is claimed is:
1. A power converter, comprising:
    an energy transfer element coupled between an input of the power converter and an output of the power converter;
    a power switch coupled to the energy transfer element;
    an active clamp switch coupled to the energy transfer element and the power switch;

a first controller coupled to the active clamp switch and the power switch; and a second controller configured to control a synchronous rectifier switch, the second controller further configured to generate a request signal in response to the output of the power converter being below a threshold, the second controller comprising:

a request control circuit configured to generate the request signal, the request control circuit further configured to generate a secondary control signal to control the synchronous rectifier switch; and a discharge prevention circuit configured to prevent a parasitic capacitance discharge of the power switch caused by a turn on of the synchronous rectifier switch, the discharge prevention circuit further configured to generate a first state of a prevent signal to disable the secondary control signal from control of the synchronous rectifier switch when a period of the request signal is greater than a first time threshold, the discharge prevention circuit further configured to generate a second state of the prevent signal to enable the secondary control signal to control the synchronous rectifier switch when the period of the request signal is less than a second time threshold.

2. The power converter of claim 1, the second controller comprising a prevention switch coupled to receive the prevent signal to prevent the parasitic capacitance discharge of the power switch caused by a turn on of the synchronous rectifier switch, the prevention switch further coupled to receive the prevent signal to enable the secondary control signal to control the synchronous rectifier switch when the period of the request signal is less than a second time threshold.

3. The power converter of claim 2, wherein the turn on of the synchronous rectifier switch is configured to generate a negative secondary current in a secondary winding of the energy transfer element, wherein a turn off of the synchronous rectifier switch transfers energy from the secondary winding to a primary winding of the energy transfer element such that the parasitic capacitance of the power switch discharges.

4. The power converter of claim 1, wherein the discharge prevention circuit comprises:

a first timer circuit coupled to generate a light load signal in response to the period of the request signal being greater than the first time threshold;

a second timer circuit coupled to generate an inverse light load signal in response to the period of the request signal being less than the second time threshold; and a discharge prevention state machine configured to generate the prevent signal according to a plurality of discharge prevention states in response to the request signal, the light load signal, and the inverse light load signal.

5. The power converter of claim 4, wherein the plurality of discharge prevention states comprises:

a normal operation state during which the prevent signal is in a first state, wherein the normal operation state is a default state;

a light load operation state during which the prevent signal is in a second state; and a detection state during which a count signal is incremented and the discharge prevention state machine transitions to the normal operation state when the count signal is equal to a count threshold.

6. The power converter of claim 5, the discharge prevention state machine further configured to remain in the normal operation state in response to the inverse light load signal.

7. The power converter of claim 5, the discharge prevention state machine further configured to transition from the normal operation state to the light load operation state in response to the light load signal.

8. The power converter of claim 7, the discharge prevention state machine further configured to transition from the light load operation state to a reset count state in response to the light load signal and the request signal, wherein during the reset count state the count signal is set to zero and the discharge prevention state machine transitions back to the light load operation state.

9. The power converter of claim 7, the discharge prevention state machine further configured to transition to the detection state in response to the inverse light load signal and the request signal, wherein during the detection state the count signal is incremented and the discharge prevention state machine transitions to the light load operation state in response to the count signal not being equal to the count threshold.

10. The power converter of claim 9, the discharge prevention state machine further configured to transition to the normal operation state in response to the count signal being equal to the count threshold.

11. The power converter of claim 1, the first controller comprising:

a regulation control circuit configured to generate a drive signal in response to the request signal to transfer energy from the input of the power converter to the output of the power converter; and a clamp control circuit configured to control the active clamp switch to inject charge stored in a clamp capacitor into the energy transfer element to discharge the parasitic capacitance of the power switch into the energy transfer element before the power switch is turned on.

12. The power converter of claim 1, wherein the second controller is galvanically isolated from the first controller.

13. A method for controlling a power converter, comprising:

receiving a request signal representative of an output of the power converter;

comparing a period of the request signal to a first time threshold;

responsive to the period of the request signal being greater than the first time threshold, disabling an enable switch to prevent a turn on of a synchronous rectifier switch from causing discharge of a parasitic capacitance of a power switch, and resetting a count;

responsive to the period of the request signal not being greater than the first time threshold, comparing the period of the request signal to a second time threshold;

responsive to the period of the request signal not being greater than the second time threshold, resetting the count;

responsive to the period of the request signal being greater than the second time threshold, incrementing the count;

comparing the count to a count threshold; and responsive to the count being equal to the count threshold, enabling the enable switch to control the synchronous rectifier switch and resetting the count.

14. A controller configured for use in a power converter, the controller comprising:

a request control circuit coupled to receive a feedback signal representative of an output of the power converter, the request control circuit configured to generate a secondary control signal to control a secondary switch, the request control circuit further configured to generate a request signal in response to the output of the power converter being below an output reference;

a discharge prevention circuit coupled to receive the request signal, the discharge prevention circuit configured to generate a first state of an enable signal in response to a period of the request signal being greater than a first time threshold, the discharge prevention circuit further configured to generate a second state of the enable signal in response to the period of the request signal being less than a second time threshold; and an enable switch coupled to receive the enable signal, wherein the first state of the enable signal blocks the secondary control signal to enable the secondary switch to prevent a parasitic capacitance discharge of a power switch caused by a turn on of the secondary switch, wherein the second state of the enable signal enables the secondary control signal to control the secondary switch.

15. The controller of claim 14, wherein the discharge prevention circuit comprises:

a first timer coupled to generate a light load signal in response to the period of the request signal being greater than the first time threshold;

a second timer coupled to generate an inverse light load signal in response of the period of the request signal being less than the second time threshold; and a discharge prevention state machine configured to generate the enable signal according to a plurality of discharge prevention states in response to the request signal, the light load signal, and the inverse light load signal.

16. The controller of claim 15, wherein the plurality of discharge prevention states comprises:

a normal operation state during which the enable signal is in the second state and a count signal is in a first state;

a light load operation state during which the enable signal is in the first state; and a detection state during which the count signal is incremented and checked to be equal to a count threshold, wherein the discharge prevention state machine transitions to the normal operation state.

17. The controller of claim 16, the discharge prevention state machine further configured to remain in the normal operation state in response to the inverse light load signal.

18. The controller of claim 16, the discharge prevention state machine further configured to transition from the normal operation state to the light load operation state in response to the light load signal.

19. The controller of claim 18, the discharge prevention state machine further configured to transition from the light load operation state to a reset count state during which the count signal is set to zero, wherein the discharge prevention state machine transitions back to the light load operation state.

20. The controller of claim 18, the discharge prevention state machine further configured to transition from the light load operation state to the detection state in response to the inverse light load signal and the request signal, wherein during the detection state the count signal is incremented, and the discharge prevention state machine transitions to the light load operation state in response to the count signal not being equal to the count threshold.

21. The controller of claim 20, wherein the discharge prevention state machine is configured to transition to the normal operation state in response to the count signal being equal to the count threshold.

22. A power converter, comprising:

an energy transfer element coupled between an input of the power converter and an output of the power converter;

a power switch coupled to the energy transfer element, the power switch configured to control a transfer of energy from the input of the power converter to the output of the power converter;

an active clamp switch coupled to the energy transfer element and the power switch;

a first controller coupled to the active clamp switch and the power switch; and a second controller configured to control a secondary switch, the second controller further configured to generate a request signal in response to the output of the power converter being below a threshold, the second controller comprising:

a request control circuit configured to generate the request signal, the request control circuit further configured to generate a secondary control signal to control the secondary switch; and a prevention switch coupled to block control of the secondary switch by the secondary control signal, the prevention switch coupled to prevent the transfer of energy from the output of the power converter to the power switch caused by a turn on of the secondary switch, the prevention switch further coupled to enable the secondary control signal to control the secondary switch when a period of the request signal is less than a second time threshold.

23. The power converter of claim 22, wherein the second controller further comprises a discharge prevention circuit configured to generate a first state of a prevent signal to prevent the transfer of energy from the output of the power converter to the power switch caused by the turn on of the secondary switch when the period of the request signal is greater than a first time threshold, the discharge prevention circuit further configured to generate a second state of the prevent signal to enable the secondary control signal to control the secondary switch when the period of the request signal is less than the second time threshold.

24. The power converter of claim 23, the discharge prevention circuit coupled to the prevention switch, the discharge prevention circuit further configured to control the prevention switch in response to the request signal.

25. The power converter of claim 23, wherein the discharge prevention circuit comprises:

a first timer coupled to generate a light load signal in response to the period of the request signal being greater than the first time threshold;

a second timer coupled to generate an inverse light load signal in response to the period of the request signal being less than the second time threshold; and a discharge prevention state machine configured to generate the prevent signal according to a plurality of discharge prevention states in response to the request signal, the light load signal, and the inverse light load signal.

26. The power converter of claim 25, wherein the plurality of discharge prevention states comprises:

a normal operation state during which the prevent signal is in the second state and a count signal is in a first state;

a light load operation state during which the prevent signal is in the first state; and a detection state during which the count signal is incremented transitions to the normal operation state when the count signal is equal to a count threshold.

27. The power converter of claim 26, wherein the discharge prevention state machine is configured to remain in the normal operation state in response to the inverse light load signal.

28. The power converter of claim 26, the discharge prevention state machine further configured to transition to the light load operation state in response to the light load signal.

29. The power converter of claim 28, wherein the light load operation state transitions to a reset count state during which the count signal is set to zero, wherein the discharge prevention state machine transitions back to the light load operation state.

30. The power converter of claim 28, the discharge prevention state machine further configured to transition to the detection state from the light load operation state in response to the inverse light load signal and the request signal, wherein during the detection state the count signal is incremented, and the count signal is compared to the count threshold, wherein the discharge prevention state machine transitions to the light load operation state in response to the count signal not being equal to the count threshold.

31. The power converter of claim 30, the discharge prevention state machine further configured to transition to the normal operation state in response to the count signal being equal to the count threshold.

* * * * *